United States Patent [19]

Musser et al.

[11] Patent Number: 4,601,532
[45] Date of Patent: Jul. 22, 1986

[54] NARROW BAND LIGHT ABSORBING FILTER

[75] Inventors: Arlene K. Musser, St. Paul; Peter M. Koelsch, Bloomington, both of Minn.

[73] Assignee: Minnesota Mining and Manufacturing Company, St. Paul, Minn.

[21] Appl. No.: 492,690

[22] Filed: May 9, 1983

[51] Int. Cl.$^4$ .................. F21V 9/06; G02B 5/22; G02B 5/28
[52] U.S. Cl. .................... 350/1.1; 350/311; 252/589
[58] Field of Search .......... 350/1.1, 1.6, 311; 252/589

[56] References Cited

U.S. PATENT DOCUMENTS

| | | | |
|---|---|---|---|
| 1,497,747 | 6/1924 | Wieland | 252/589 X |
| 2,568,894 | 9/1951 | Mackey | 252/589 |
| 3,052,636 | 9/1962 | Strobel | 252/589 |
| 3,060,029 | 10/1962 | Gerwonka | 252/589 X |
| 3,074,971 | 1/1963 | Strobel | 252/589 X |
| 3,125,597 | 3/1964 | Wahl | 252/589 |
| 3,461,287 | 8/1969 | Rai | 252/589 X |
| 4,077,971 | 3/1978 | Fujita | 252/589 X |
| 4,431,726 | 2/1984 | Kojima | 252/589 X |

OTHER PUBLICATIONS

"Part II–Colour, Dyeing and Fastness Properties . . . " J.S.D.C., Apr. 1977 A. T. Peters and M. S. Wild, pp. 133–140.

*Primary Examiner*—Teddy S. Gron
*Assistant Examiner*—Catherine S. Kilby
*Attorney, Agent, or Firm*—Donald M. Sell; James A. Smith; Mark A. Litman

[57] ABSTRACT

An optical transmission radiation filter absorbing between 320 and 500 nm comprises a polymeric film having a benzylidene or naphthalamide dye in combination with a phenol-formaldehyde resin which shifts the absorbing wavelength of the dyes.

16 Claims, No Drawings

NARROW BAND LIGHT ABSORBING FILTER

FIELD OF THE INVENTION

The present invention relates to optical filter layers for use with ultraviolet radiation (UV) and visible light imageable photosensitive media. In particular, filters are disclosed which absorb in narrow radiation bands and can be easily designed to absorb within the range of 320 to 500 nm to prevent halation in the final image.

BACKGROUND OF THE INVENTION

A significant problem that has been faced in many forms of imaging technology is termed halation. This image quality diminishing phenomenon is caused by the reflection of actinic radiation which has passed through the radiation sensitive medium and struck a supporting surface in the imageable article. The reflected radiation then passes through the sensitive medium again, imaging the article in a pattern not faithful to the original exposing light pattern. This causes a reduced faithfulness in the final image.

One traditional way of reducing halation is to provide a radiation-absorbing characteristic in the supporting surface. Dye layers, carbon black layers and the like have often been used for this purpose. The use of such radiation-absorbing, antihalation layers means that the imageable article and often the imaged article will have the color of the radiation-absorbing material of the support surface. Bleachable dyes or strippable layers are often used to allow that undesirable color contribution to be removed. That approach requires considerable manual labor and design expertise to work even moderately well and increases the cost of manufacturing the film by adding layers and coating steps.

It is generally known that ultraviolet (UV) radiation and near ultraviolet (near UV) radiation tend to be the most culpable ranges of radiation with respect to halation. The use of titania-filled or coated substrates tends to greatly reduce that problem. Titania provides a clean white background and effectively absorbs much of the radiation below 380 nm. The use of titania still does not solve the problem of near UV halation (i.e., radiation between 390–480). That problem is significant in the reproduction of visible images.

SUMMARY OF THE INVENTION

The present invention describes a filter layer which can absorb radiation between 320 and 500 nm comprising at least one yellow dye selected from the group consisting of benzylidene and naphthalimide dyes and a resin binder comprising a chromatically shifting effective amount of a phenol-formaldehyde resin.

DETAILED DESCRIPTION OF THE INVENTION

It has been found according to the present invention that phenol-formaldehyde resins (both novolaks and resoles) shift the wavelength of maximum radiation absorbance of benzylidene and naphthalamide dyes. Numerous other resins have been tried with these dyes and many other dyes have been tried with phenol-formaldehyde resins, but to date only those unique combinations evidence a significant wavelength shift.

Benzylidene dyes are well known in the literature. These dyes have the common nucleus:

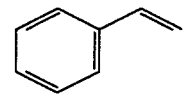

A general formula covering many, but not all of the benzylidene dyes useful in the practice of the present invention is:

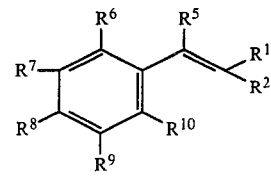

wherein $R^1$ and $R^2$ are independently selected from hydrogen

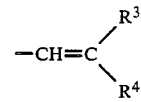

and electron-withdrawing groups, with the proviso that only one of $R^1$ and $R^2$ may be hydrogen, $R^3$ and $R^4$ are independently selected from electron-withdrawing groups, $R^5$ is hydrogen, methyl or cyano, $R^6$, $R^7$, $R^8$, $R^9$ and $R^{10}$ are independently hydrogen, alkoxy of 1 to 4 carbon atoms, dialkyl amino (with alkyl groups of 1 to 4 carbon atoms), nitro, or amido, and one pair of adjacent groups may comprise the atoms necessary to form a fused benzene or 5- or 6-membered heterocyclic ring (comprised of only C, N, S, O and H atoms). It is highly desirable to have electron-donating groups on the aromatic ring, particularly in the positions of $R^6$, $R^8$ and $R^{10}$ to influence the strength of absorption and the degree of color shift. The $R^8$ position appears to be the most important for this color shift.

Strong electron withdrawing groups are preferred for $R^1$ and $R^2$ (and for $R^3$ and $R^4$) such as CN, $SO_2C_6H_5$, $SO_2C_xF_{2x+1}$ (where x is 1 to 8), and $CO_2$-hydrocarbon, where preferably the hydrocarbon is alkyl, aryl, arylalkyl or alkylaryl (e.g., $CO_2$-alkyl (1 to 4 carbon atoms in the alkyl)). With very strong electron-withdrawing groups, the remaining $R^1$ or $R^2$ groups may even be a non-electron-withdrawing group such as phenyl (e.g., tolyl), although that is not preferred.

The naphthalimide dyes have a common nucleus of:

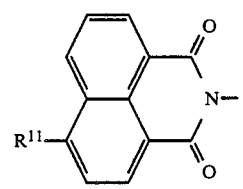

Most of these dyes can be represented by the general structural formula:

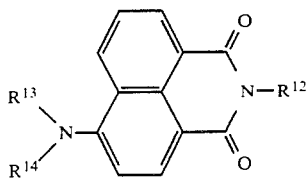

wherein $R^{11}$ is selected from —N, —O, —S or halogen, $R^{12}$ is selected from the group consisting of alkyl of 1 to 12 carbon atoms, alkaryl of up to 12 carbon atoms, aryl of up to 10 carbon atoms and arylalkyl of up to 12 carbon atoms, and $R^{13}$ and $R^{14}$ are independently selected from the group consisting of hydrogen, alkyl (of 1 to 8 carbon atoms), aryl of up to 10 carbon atoms, and alkaryl of up to 12 carbon atoms (preferably tolyl).

These dyes may be conventionally mixed and dissolved with the polymeric binders and coated onto a release surface to form the filter. The filter layer may also be carried on a transparent substrate and be used in that form as a filter. After removal of the solvent, the dried film is stripped from the release surface and may be used as a filter. The phenol-formaldehyde resin may be used as 100% of the polymeric resin of the film, or may be used in smaller portions in combination with any other binder that is compatible (does not separate or cloud) with the phenol-formaldehyde resin. As smaller amounts of phenol-formaldehyde resin are used, the amount of the chromatic shift decreases. The chromatic shift in the maximum absorption of the dyes by the phenol-formaldehyde resins is always towards the red. That is, the wavelength of the λmax increases with increasingly effective amounts of the phenol-formaldehyde resin. The degree of the shift may vary with individual dyes within the classes of benzylidenes and naphthalimides. Some dyes may shift only a few nm when going from 0% to 100% phenolformaldehyde resin while others may shift 30 to 40 nm.

Any compatible resin may be used in combination with the phenol-formaldehyde resin. Amongst the preferred resins are polyvinylacetals (polyvinyl butyral and polyvinyl formal), polyethylene terephthalate, acrylic polymers and copolymers (polymethylmethacrylate), methylacrylate/methylmethacrylate copolymers, etc.), polystyrene, phenoxy resins, vinyl resins and copolymers (polyvinylidene chloride, vinyl chloride/vinyl acetate copolymers) and the like. The film should have structural integrity and should be greater than 1 mil in thickness as a single layer construction. It, of course, may be much thinner as a coating on a transparent substrate as long as it provides the desired transmission optical density. Preferably, the film is greater than 2 mils and usually is in the range of 5–20 mils, although thicker films provide no real disadvantage. The dye containing layers may also be coated onto a transparent carrier or support layers to provide structural integrity. The dye should be present in an amount sufficient to provide a transmission optical density of at least 0.5 at the wavelength of the maximum absorption for the dye. Preferably the concentration of the dye will provide an optical density of greater than 0.8 or greater than 1.0. This may require a concentration of dye of from 0.2 to 15% by weight of the binder, depending upon the thickness of the film.

These and other aspects of the invention are shown in the following non-limiting examples:

EXAMPLE 1

The two following solutions were prepared to show the chromatic shift of dyes according to the present invention:

| SOLUTION A (grams) | SOLUTION B (grams) | INGREDIENTS |
| --- | --- | --- |
| 9.0 | 0.0 | modified resinox, the reaction product of Resinox RS7280 and DD1-1410 diisocyanate, as a 29.2% solids in methyl ethyl ketone solution |
| 0.0 | 9.0 | polyvinyl butyral (Butvar B-76) |
| 0.30 | 0.30 | dispersed Yellow dye 31 |
| 20.7 | 27.0 | Additional methyl ethyl ketone |

The solutions were coated onto a 2-mil thick transparent polyester film with a #10 Meyer bar and dried at 190° F. (88° C.) for two minutes. The film produced with Solution A had an absorbance maximum at 452.8 nm, while the film from Solution B had an absorbance maximum at 424.5 nm. The shape of the absorption curves for both coatings remained approximately uniform. This enables the filter to maintain a narrow range of absorption without skewing or shifting at the toe or tail of the absorption curve. The uniformity in the shape of both the peak and the width of the base was maintained.

EXAMPLE 2

This example describes a large-scale preparation of a specific filter and its use as an effective antihalation tool. The following coating solution was prepared:

| Dispersed Yellow Dye 31 | 60 g |
| --- | --- |
| Butvar B-76 of Example 1 | 108 g |
| Modified Resinox | 1440 g |
| Additional MEK | 1720 g |

This solution was reverse roll coated onto 2-mil thick photograde transparent polyester film to various optical densities, and dried at 190° F. The resulting films had absorbance maxima at 447 nm. This was desired since previous experimentation had shown that a filter with this absorbance would have an optimal antihalation effect on 3M Positive Matchprint. Samples of cyan Positive Matchprint, after lamination onto a titanium dioxide-coated support, were exposed using a 5 KW diazo lamp as the UV light source through these filters, and subsequently processed with an aqueous alkaline developer. The samples exposed through the filters had substantially better image quality with little halation, especially at longer exposure times. The more dense the yellow filter was made, the greater the effect on resolution and exposure latitude became.

EXAMPLE 3

Each of the following dyes were used in these Examples. Five separate coating solutions were prepared for each dye. The coating solutions each consisted of dye, the modified Resinox of Example 1 and polyvinyl butyral. The composition of the individual solutions was as follows in weight percent of the dry film:
| SOLUTION | DYE | RESINOX | POLYVINYL BUTYRAL |
|----------|-----|---------|-------------------|
| A | 10 | 90 | 0 |
| B | 10 | 72 | 18 |
| C | 10 | 45 | 45 |
| D | 10 | 18 | 72 |
| E | 10 | 0 | 90 |
The dyes used in the Examples had the structural formulae:
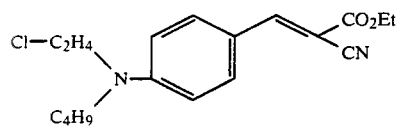
3.
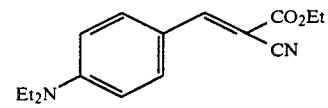
4.
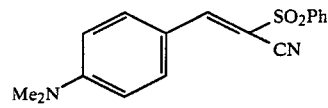
5.
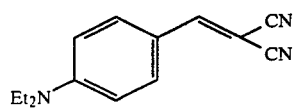
6.
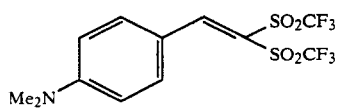
7.
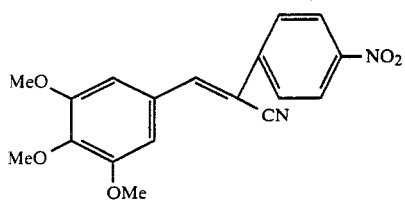
8.
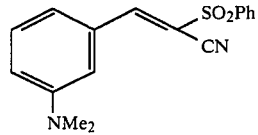
9.
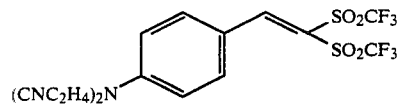
10.
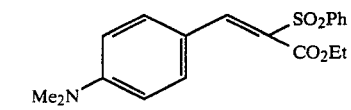
11.
-continued
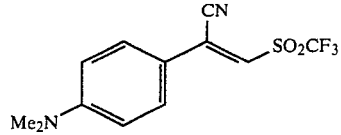
12.
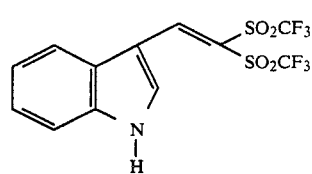
13.
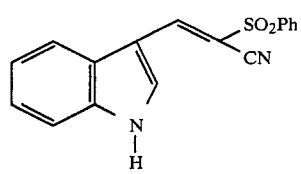
14.
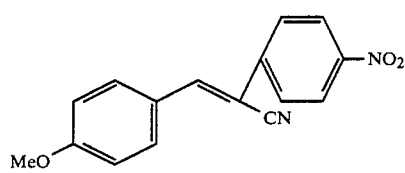
15.
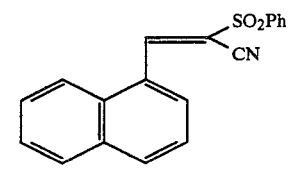
16.
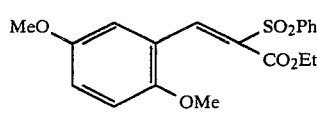
17.
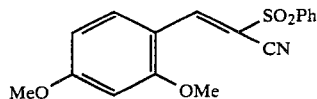
18.
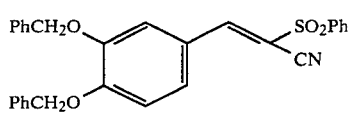
19.
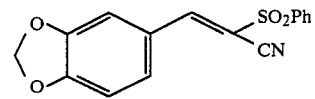
20.
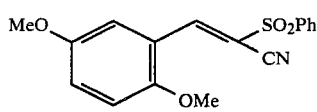
21.
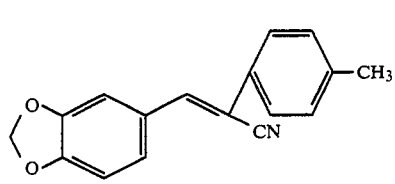
22.

-continued
23.
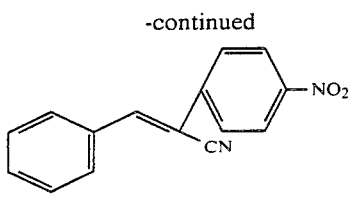
24.
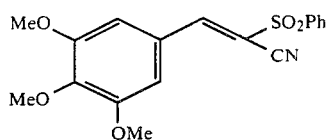
25.
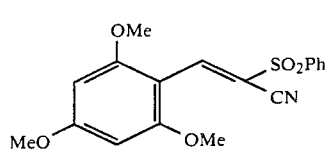
26.
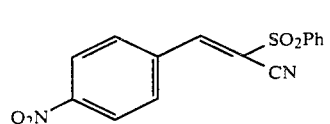
27.
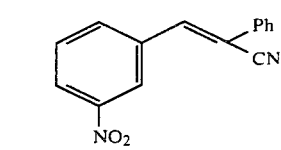
28.
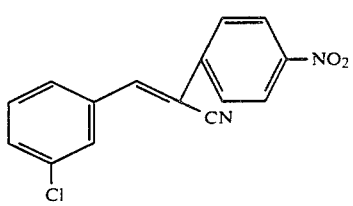
29.
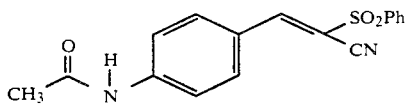
30.
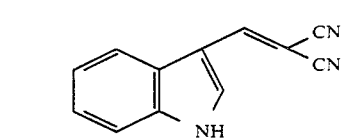
-continued
31.
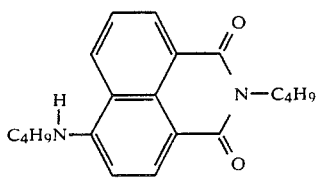
32.
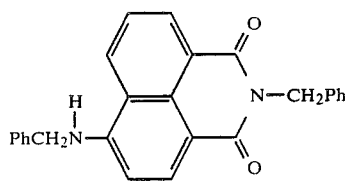
33.
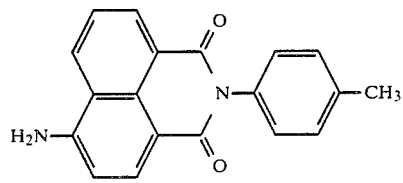
34.
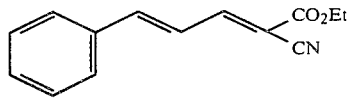
35.
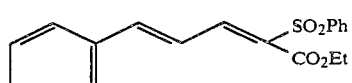
36.
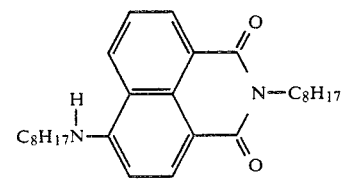
37.
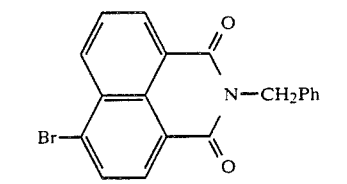
After coating and drying of these solutions onto a 2-mil transparent polyester substrate, the following data were obtained:
| DYE | SOLUTION A | | | SOLUTION B | | | SOLUTION C | | | SOLUTION D | | | SOLUTION E | | |
|---|---|---|---|---|---|---|---|---|---|---|---|---|---|---|---|
| | λmax | A | Δ W½ | λmax | A | Δ W½ | λmax | A | Δ W½ | λmax | A | Δ W½ | λmax | A | Δ W½ |
| 3 | 452.8 | 2.6 | 64 | 448.2 | 2.3 | 64 | 438.0 | 2.1 | 66 | 428.0 | 2.6 | 66 | 424.5 | 1.1 | 62 |
| 4 | 454.0 | 2.3 | 57 | 449.0 | 2.27 | 58 | 440.3 | 3.16 | 58 | 431.7 | 2.6 | 58 | 424.1 | 1.9 | 58 |
| 5 | 449.5 | 2.36 | 56 | 444.0 | 2.55 | 56 | 436.5 | 2.16 | 56 | 428.6 | 2.04 | 56 | 421.3 | 2.65 | 60 |
| 6 | 460.5 | 2.23 | 73 | 451.9 | 2.05 | 69 | 445.8 | 2.7 | 70 | 439.4 | 2.63 | 58 | 436.3 | 2.62 | 65 |
| 7 | 462.5 | 1.95 | 74 | 460.8 | 1.48 | 68 | 457.3 | 1.73 | 63 | 453.1 | 2.71 | 52 | 448.9 | 1.68 | 61 |
| 8 | 378.1 | .80 | 110 | 377.8 | 1.98 | 104 | 379.0 | .80 | 102 | 376.2 | .97 | 96 | 376.3 | .86 | 94 |
| 9 | <320 | | | <320 | | | <320 | | | <320 | | | <320 | | |
| 10 | 440.3 | 1.24 | 54 | 439.1 | 1.22 | 53 | 437.2 | 1.42 | 58 | 434.1 | 1.05 | 62 | 429.8 | 2.23 | 63 |
| 11 | 361.8 | 1.68 | 62 | 357.4 | 2.14 | 52 | 350.0 | 2.92 | 52 | 340.2 | 1.16 | 53 | 335.5 | 2.64 | 48 |
| 12 | 492.5 | 1.13 | 94 | 488.2 | 1.07 | 88 | 476.5 | 1.27 | 88 | 465.0 | 2.16 | 82 | 459.4 | 1.41 | 78 |
| 13 | 411.0 | .77 | 66 | 410.1 | .77 | 64 | 408.5 | 1.62 | 60 | 405.6 | 2.06 | 58 | 402.5 | 1.75 | 56 |
| 14 | 398.4 | .76 | 70 | 393.4 | .74 | 70 | 389.1 | .85 | 68 | 384.4 | .71 | 65 | 383.8 | .72 | 64 |

-continued

| DYE | SOLUTION A | | | SOLUTION B | | | SOLUTION C | | | SOLUTION D | | | SOLUTION E | | |
|---|---|---|---|---|---|---|---|---|---|---|---|---|---|---|---|
| | λmax | A | Δ W½ | λmax | A | Δ W½ | λmax | A | Δ W½ | λmax | A | Δ W½ | λmax | A | Δ W½ |
| 15 | 382.0 | 1.30 | 82 | 381.2 | 2.44 | 82 | 375.8 | 1.18 | 80 | 373.3 | 1.66 | 76 | 370.9 | 2.24 | 70 |
| 16 | 383.8 | .50 | 86 | 379.6 | .50 | 82 | 375.0 | .52 | 84 | 369.2 | 1.04 | 74 | 368.1 | .54 | 72 |
| 17 | 372.4 | .41 | 84 | 369.0 | .34 | 82 | 368.0 | .43 | 82 | 361.8 | .26 | 80 | 362.9 | .47 | 70 |
| 18 | 385.6 | 1.00 | 64 | 382.9 | .90 | 62 | 377.4 | 1.05 | 60 | 372.7 | 1.66 | 55 | 369.7 | 2.27 | 53 |
| 19 | 375.0 | .58 | 82 | 372.4 | .61 | 78 | 368.8 | .64 | 77 | 366.3 | 1.16 | 70 | 364.1 | .88 | 74 |
| 20 | 380.0 | .78 | 73 | 377.2 | .82 | 71 | 372.3 | .91 | 66 | 367.8 | 1.31 | 60 | 365.8 | 2.14 | 59 |
| 21 | 416.5 | .37 | 94 | 415.2 | .42 | 90 | 410.2 | .34 | 90 | 406.0 | .47 | 84 | 402.9 | .49 | 84 |
| 22 | 360.4 | .93 | 75 | 359.2 | 1.29 | 73 | 356.8 | 1.09 | 70 | 354.4 | 1.65 | 66 | 350.0 | 2.13 | 64 |
| 23 | 350.0 | 1.21 | 112 | 342.9 | 1.15 | 100 | 340.8 | 2.3 | 94 | 337.6 | 1.75 | 94 | 336.3 | 3.26 | 90 |
| 24 | 362.1 | .78 | 90 | 359.0 | .68 | 90 | 357.2 | .65 | 90 | 355.5 | .68 | 88 | 353.9 | .63 | 88 |
| 25 | 379.3 | 1.16 | 68 | 373.7 | 1.12 | 69 | 367.7 | 1.01 | 69 | 361.2 | 1.75 | 66 | 357.9 | 2.09 | 64 |
| 26 | <320 | | | <320 | | | <320 | | | <320 | | | <320 | | |
| 27 | <320 | | | <320 | | | <320 | | | <320 | | | <320 | | |
| 28 | 337.2 | .97 | | 330.9 | .95 | | <320 | | | <320 | | | <320 | | |
| 29 | 355.7 | 1.09 | 78 | 350.0 | .55 | 84 | 350.0 | .68 | 77 | 350.0 | 1.46 | 70 | 350.0 | 1.88 | 70 |
| 30 | 400.8 | .69 | 72 | 397.5 | 1.15 | 76 | 392.9 | 1.70 | 68 | 388.2 | 1.85 | 66 | 386.8 | 1.69 | 64 |
| 31 | 453.6 | .51 | 76 | 450.4 | .53 | 78 | 444.6 | .96 | 77 | 438.5 | .68 | 78 | 431.0 | .57 | 75 |
| 32 | 447.7 | .39 | 66 | 446.5 | .43 | 68 | 441.5 | .40 | 68 | 433.8 | .65 | 70 | 427.0 | .40 | 69 |
| 33 | 437.1 | .55 | 74 | 436.6 | .47 | 80 | 435.0 | .74 | 78 | 426.9 | .45 | 78 | 425.4 | .67 | 78 |
| 34 | 360.9 | 2.8 | 84 | 355.0 | 1.19 | 78 | 350.0 | 2.17 | 73 | 348.0 | 3.4 | | 344.6 | 3.6 | |
| 35 | 350.0 | .66 | 78 | 350.0 | .68 | 78 | 350.0 | 1.28 | 72 | 338.4 | .75 | | 337.1 | 1.56 | 72 |
| 36 | 451.8 | .32 | 66 | 451.8 | .30 | 65 | 443.4 | .41 | 66 | 435.5 | .45 | 69 | 431.1 | .41 | 68 |
| 37 | 448.2 | .28 | 70 | 444.9 | .36 | 70 | 439.9 | .38 | 72 | 433.8 | .36 | 71 | 429.4 | .23 | 72 |

We claim:

1. An optical transmission filter absorbing radiation between 320 and 500 nm comprising a binder and at least one dye selected from the class of benzylidenes characterized by the fact that the binder comprises sufficient amount of phenol-formaldehyde resin to cause a shift in the spectral absorbance towards the red of said at least one dye.

2. The filter of claim 1 wherein said at least one dye is represented by the formula:

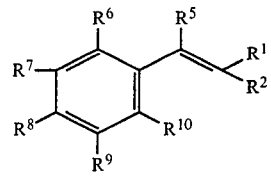

wherein $R^1$ and $R^2$ are independently selected from the group consisting of hydrogen, electron-withdrawing groups and

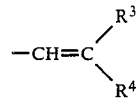

with the proviso that no more than one of $R^1$ and $R^2$ may be hydrogen,
$R^3$ and $R^4$ are independently selected from electron-withdrawing groups,
$R^5$ is selected from the class consisting of hydrogen, methyl and cyano, and
$R^6$, $R^7$, $R^8$, $R^9$ and $R^{10}$ are independently selected from the group consisting of hydrogen, alkoxy of 1 to 4 carbon atoms, dialkyl amino (with alkyl groups of 1 to 4 carbon atoms), nitro and amido, and one pair of groups adjacent on the benzene ring may comprise the atoms necessary to form a fused benzene ring or 5- or 6-membered heterocyclic ring comprised of only C, S, N and O ring atoms.

3. The filter of claim 2 wherein at least one of $R^6$, $R^8$ and $R^{10}$ are electron-donating groups.

4. The filter of claim 2 wherein $R^1$ and $R^2$ are both strong electron-withdrawing groups selected from the group consisting of CN, $CO_2R$ wherein R is a hydrocarbon group of 1–12 carbon atoms, $SO_2C_6H_5$ and $SO_2C_xF_{2x+1}$ wherein x is 1 to 8.

5. The filter of claim 3 wherein $R^1$ and $R^2$ are both strong electron-withdrawing groups selected from the group consisting of CN, $SO_2C_6H_5$ and $SO_2C_xF_{2x+1}$ wherein x is 1 to 8.

6. The filter of claim 2 wherein $R^8$ comprises a dialkyl amino.

7. The filter of claim 4 wherein $R^8$ comprises a dialkyl amino.

8. The filter of claim 2 wherein at least one of $R^1$ and $R^2$ is cyano and the other is an electron-withdrawing group.

9. The filter of claim 3 wherein at least one of $R^1$ and $R^2$ is cyano and the other is an electron-withdrawing group.

10. The filter of claim 6 wherein at least one of $R^1$ and $R^2$ is cyano and the other is an electron-withdrawing group.

11. The filter of claim 2 wherein the phenol-formaldehyde resin comprises from 20 to 100% by weight of the binder.

12. The filter of claim 3 wherein the phenol-formaldehyde resin comprises from 20 to 100% by weight of the binder.

13. The filter of claim 4 wherein the phenol-formaldehyde resin comprises from 20 to 100% by weight of the binder.

14. The filter of claim 5 wherein the phenol-formaldehyde resin comprises from 20 to 100% by weight of the binder.

15. The filter of claim 8 wherein the phenol-formaldehyde resin comprises from 20 to 100% by weight of the binder.

16. The filter of claim 2 wherein said dye has the formula:

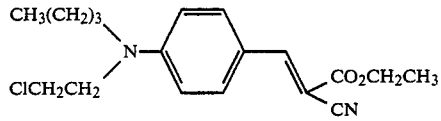

* * * * *